United States Patent [19]

Perry et al.

[11] Patent Number: 5,151,182
[45] Date of Patent: Sep. 29, 1992

[54] POLYPHENYLENE OXIDE-DERIVED MEMBRANES FOR SEPARATION IN ORGANIC SOLVENTS

[75] Inventors: Mordechai Perry, Petach Tikva; Henia Yacubowicz, Ness Ziona; Charles Linder, Rehovot; Mara Nemas, Neve Monosson; Reuven Katraro, Rishon Lezion, all of Israel

[73] Assignee: Membrane Products Kiryat Weizmann Ltd., Rehovot, Israel

[21] Appl. No.: 752,842

[22] Filed: Aug. 30, 1991

[51] Int. Cl.$^5$ .............................................. B01D 71/00
[52] U.S. Cl. ................................. 210/500.27; 264/45.1
[58] Field of Search ................. 264/41, 45.1; 204/301; 210/500.1, 500.21, 500.27, 500.36

[56] References Cited

U.S. PATENT DOCUMENTS

| | | |
|---|---|---|
| 3,556,305 | 1/1971 | Shorr . |
| 3,567,810 | 3/1971 | Baker . |
| 3,615,024 | 10/1971 | Michaels . |
| 4,029,582 | 6/1977 | Ishii . |
| 4,125,462 | 11/1978 | Latty . |
| 4,230,463 | 10/1980 | Henis et al. . |
| 4,243,507 | 1/1981 | Martin et al. ........................ 204/301 |
| 4,243,701 | 1/1981 | Riley et al. . |
| 4,468,500 | 8/1984 | Malon et al. . |
| 4,468,501 | 8/1984 | Zampini et al. . |
| 4,477,634 | 10/1984 | Linder et al. . |
| 4,553,983 | 11/1985 | Baker . |
| 4,690,765 | 9/1987 | Linder et al. . |
| 4,690,766 | 9/1987 | Linder et al. . |
| 4,704,324 | 11/1987 | Davis et al. . |
| 4,778,596 | 10/1988 | Linder et al. . |
| 4,855,048 | 8/1989 | Tang et al. . |
| 4,902,422 | 2/1990 | Pinnau et al. . |

FOREIGN PATENT DOCUMENTS

| | | |
|---|---|---|
| 0008945 | 3/1980 | European Pat. Off. . |
| 0041839 | 12/1981 | European Pat. Off. . |
| 0099432 | 2/1984 | European Pat. Off. . |
| 0130963 | 1/1985 | European Pat. Off. . |
| 0214792 | 3/1987 | European Pat. Off. . |
| 2000720 | 1/1979 | United Kingdom . |
| 1558807 | 1/1980 | United Kingdom . |
| 2027614 | 2/1980 | United Kingdom . |

OTHER PUBLICATIONS

Ward et al., J. Memb. Sci., 1976, 1: 99–108.
Baker et al., J. Memb. Sci., 1987, 31: 259–271.
Strathmann et al., Desalination, 1975, 16, 179.
Murari et al., J. Memb. Sci., 1983, 16: 121–135 and 181–193.
Kimmerle et al., J. Memb. Sci., 1988, 36: 477–488.

*Primary Examiner*—Frank Sever
*Attorney, Agent, or Firm*—Ladas & Parry

[57] ABSTRACT

Composite solvent stable membranes for treating organic liquids comprise a crosslinked layer of less than 5 microns in thickness supported on a solvent stable porous membrane substrate, which layer includes at least one polymer selected from polyphenylene oxide type polymers and polysulfone type polymers, provided that the crosslinked layer includes at least one polymer derived from haloalkylated polyphenylene oxide type monomers. Such composite membranes include solvent stable membranes which swell to an extent of no more than about 10% when immersed in various organic solvents, and their mixtures with each other and/or water.

22 Claims, 1 Drawing Sheet

POLYPHENYLENE OXIDE-DERIVED MEMBRANES FOR SEPARATION IN ORGANIC SOLVENTS

FIELD AND BACKGROUND OF THE INVENTION

The present invention relates to solvent stable composite membranes which have particular application to the processing of liquid streams and in particular the purification and concentration of solutes, especially but not exclusively biologically active materials, which solutes are dissolved in organic solvents including mixtures of organic solvents as well as mixtures of organic solvents with water.

Composite membranes are known for performing separations of species from gaseous mixtures, vapors and their solutions in water or organic solvents.

Separation of the various components is usually based on imparting to the membrane a selection mechanism which enhances preferential adsorption or dissolution of certain selected species in the membrane phase, followed by its preferential transport across the membrane from the feed side to the permeate side. The transport of a selected species of solvent across a membrane is by means of a driving force, in particular an electrochemical potential, which is established across the membrane. Such a driving force can in general take the form of electrical potential, pressure difference, concentration differences and/or other driving forces either singly or in combination.

The present invention utilizes primarily pressure differences established across a membrane, in particular pressure driven processes such as microfiltration, ultrafiltration, nanofiltration and reverse osmosis, but does not exclude the utilization of other driving forces such as concentration gradients and electrical driving forces. In the processing of liquid streams performed by the membranes of the invention, and in particular the separation of dissolved components present in such streams, it is preferred to apply superatmospheric pressure, thereby leading to transport of organic solvent and some solute, while retaining other dissolved solutes.

Streams which can be treated by means of solvent stable membranes of the present invention are:

(i) Lubricating oils, which are in particular low MW components having a MW cut off in the range of 300-2000 Daltons, and which are dissolved in strong organic solvents such as NMP, phenol, MEK, MIBK, toluene and their mixtures. Their separation requires availability of solvent stable membranes which will be stable in solvents such as those specified, and which will retain the dissolved low MW oils to a sufficient degree, e.g. between 70-95%.

(ii) Catalysts dissolved in organic solvents. Several catalysts comprising metal organic complexes are in commercial use for performing catalytically enhanced polymerization reactions in organic media. These catalysts are very expensive and there is great interest in recovering them from reaction mixtures. The molecular weight of the catalyst may vary from 200-300 and up to 2000-3000 Daltons.

(iii) Low MW oligomers in paint wastes dissolved in strong organic solvents such as MEK, butyl acetate and/or other strong solvents singly or in admixture.

(iv) Biologically active materials such as antibiotics and peptides, which are frequently prepared and purified in organic solvent media or mixtures of such media with water. The measures necessary to concentrate and purify such materials are often slow and costly, and moreover must be used with extreme care in order to prevent decomposition and loss of activity of such materials in the course of processing. The use of high boiling solvents such as dimethylformamide (DMF), dimethylacetamide (DMAC), dimethylsulfoxide (DMSO) and N-methylpyrrolidone (NMP) presents particular difficulties in this respect.

SUMMARY OF THE INVENTION

The present invention provides composite solvent stable membranes which comprise a crosslinked layer of less than 5 microns, preferably less than 1 micron, in thickness, which layer includes at least one polymer selected from polyphenylene oxide type polymers and polysulfone type polymers, provided that the crosslinked layer includes at least one polymer derived from haloalkylated, especially e.g., chloromethylated or bromomethylated, polyphenylene oxide type monomers, supported on a solvent stable porous membrane substrate. Reactants which may be used for crosslinking are described below.

DETAILED DESCRIPTION OF THE INVENTION

Figure 1:
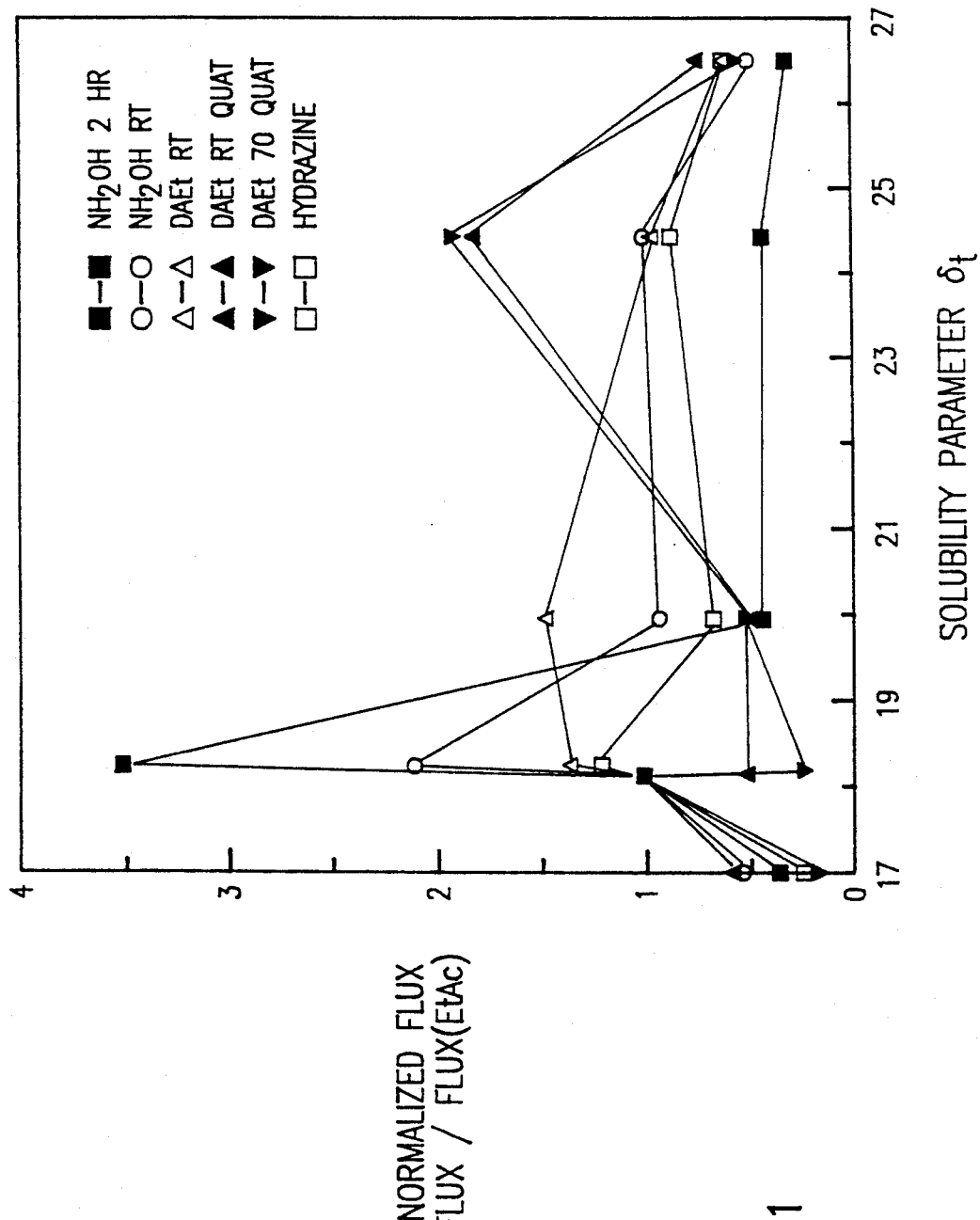
FIG. 1 shows the flux of particular embodiments of membranes according to the invention, indifferent solvents.

Suitable solvent stable substrates for making the composite solvent stable membranes of the invention are illustratively cast from a polymer, selected from copolymers and homopolymers of ethylenically unsaturated nitriles, particularly polyacrylonitrile), wherein the crosslinkers utilized for crosslinking the polyphenylene oxide type polymeric layer are selected from aliphatic, cycloaliphatic, araliphatic and aromatic amines, which may be monoamines and/or polyamines, such as mono and/or poly primary amines. Suitable amine crosslinkers are described, for example, in U.S. Pat. Nos. 4,468,500, 4,468,501, and 4,468,502, and in EP 0,130,963A1, the entire contents of all these patent documents being incorporated herein by reference. The crosslinking operation is preferably carried out after the said layer has been applied and dried. Thus, for example, the coated membrane may be immersed in a solution (e.g. an aqueous solution, optionally containing small proportions of organic solvent/s to swell the layer and thus facilitate the reaction) of crosslinker(s). It should be noted that the substrate is not restricted to one prepared from copolymers and homopolymers of ethylenically unsaturated nitriles, but that other substrate materials, such as those described elsewhere herein, may be used.

As explained in greater detail below, the membranes of the invention may be modified subsequent to crosslinking by attachment of pendent groups effective to modify the hydrophilic and/or hydrophobic characteristics of the membrane. Moreover, the crosslinked layer may be ionically charged.

The substrate may be selected from microfiltration membranes and ultrafiltration membranes and/or it may include at least one material selected from crosslinked polyacrylonitrile, polyarylene oxides, polyarylene sulfones, polyethylene, polypropylene, other polyolefins, tetrafluoropolyethylene, other perfluoro polymers, aromatic polyimides, glass, ceramics, porous metals and carbon.

The composite solvent stable membranes of the invention may be used, e.g., for purifying and/or increasing the concentration of at least one substance selected from biologically active substances having a molecular weight below 1500, present in an initial admixture with at least one organic solvent medium or an admixture thereof with water. In general, the procedure comprises applying the initial admixture under superatmospheric pressure to one surface, designated the feed surface, of the composite solvent stable membranes, which may be characterized by the fact that they possess simultaneously properties (i) and (ii), namely, (i) rejecting at least part of the at least one substance when present in the initial admixture, and (ii) allowing the permeation of at least part of the at least one medium, wherein the balance of properties (i) and (ii) is such that there accumulates at the feed surface the at least one substance in admixture with at least part of the at least one medium, in a concentration which is higher than that in the initial admixture.

For purposes of definition, it is to be understood that the initial admixture to be concentrated and/or purified by use of the composite membranes of the invention, is not merely a mixture from which the biologically active substance can be separated by conventional filtration techniques, but with this reservation it may be a solution, dispersion, suspension or any other type of admixture. The at least one medium may include (by way of non-limiting examples) a high-boiling solvent selected from dimethylformamide, dimethylacetamide, dimethylsulfoxide and N-methylpyrrolidone. By way of additional exemplification, the medium may include, alternatively or additionally, either low or high boiling solvents, such as a solvent selected from aliphatic alcohols containing 1 to 6 carbon atoms, alkyl acetates having from 1 to 6 carbon atoms in the alkyl group, aliphatic ethers containing 4 to 8 carbon atoms, aliphatic ketones containing 3 to 8 carbon atoms, aliphatic nitriles containing 1 to 6 carbon atoms, aliphatic hydrocarbons containing from 5 to 10 carbon atoms, halohydrocarbons and aromatic hydrocarbons.

When the membranes are in use, one may periodically monitor the concentration of the substance purified and/or concentrated at the feed surface, and to terminate the monitoring when a predetermined increase in the concentration, compared with concentration in the initial admixture, has been achieved.

The substances which may be purified/or concentrated by use of the composite solvent stable membranes of the invention may be e.g. enzymes, hormones, proteins, antibodies, α-aminoacids, dipeptides, tripeptides, tetrapeptides and higher order peptides. Exemplary peptides are Glu-Ala-Glu, Glu-Ala-Glu-Asn, Lys-Glu-Glu-Ala-Glu, Val-Glu-Glu-Ala-Glu, kentsin, tuftsin, Glu-His-Gly amide, Gly-Arg-Gly-Asp, diprotin, casomorphin, aspartame, and functional derivatives of any of the foregoing, and their salts and addition compounds, and mixtures thereof.

Alternatively, there may be concentrated and/or purified, by use of the composite solvent stable membranes of the invention, e.g., pencillins, cephalosporins, tetracyclines, erythromycins, chloramphenicols, sulfonamide antibacterials, other antibacterials, streptomycin, gentamycin, other aminoglycosdic antibiotics, other antibiotics, and functional derivatives of any of the foregoing, and their salts and addition compounds, and mixtures thereof. By way of example only, of such a mixture to which the inventive method may be applied, there may be mentioned trimethoprim-sulfomethoxazole mixtures, which are the subject of commercial manufacture.

As has already been indicated above, the present solvent stable membranes may be utilized for other purposes besides the separation and concentration of biologically active materials, e.g. in the separation of lubricating oils, dissolved catalysts and low MW oligomers. Thus, merely by way of example only, a solution of 10-15% paraffin oil dissolved in a 1:1 MEK/MIBK mixture may be separated into a stream containing a twofold concentration of oil and a stream containing only 10% of the original concentration.

The solvent stable substrates utilized for preparing the composite membranes of the invention are preferably made from (but not restricted to) a polymer which is selected from copolymers and homopolymers of ethylenically unsaturated nitriles, which has been subjected to a post-polymerization treatment (in order to impart to the membrane the desired characteristics), e.g. such treatment which includes at least one of the following steps, namely: cross-linking; treatment with a diazonium salt; and/or coating with a further polymer.

The crosslinked layer which includes at least one polymer derived from haloalkylated, especially e.g., chloromethylated or bromomethylated, polyphenylene oxide type monomers, may, for example, include or be constituted from a bromomethylated 2,6-dimethylphenylene oxide polymer (i.e. 2,6-dimethylphenylene oxide polymer in which some of the methyl groups have been converted to bromomethyl, by bromination), which has been crosslinked (e.g. with a diamine such as m-phenylenediamine) and which has been subsequently derivatized, particularly in order to influence flux and rejection properties of the final membrane, e.g. by quaternization and/or sulfonation, so as to introduce polar, e.g. ionic groups, and/or to introduce hydrophobic groups.

The substrate may be selected from, for example, microfiltration membranes and ultrafiltration membranes. More particularly, the substrate may include at least one material selected from crosslinked polyacrylonitrile, polyarylene oxides, polyarylene sulfones, polyethylene, polypropylene, other polyolefins, tetrafluoropolyethylene, other perfluoro polymers, aromatic polyimides, glass, ceramics and carbon.

In a particular embodiment, the solvent stable membranes utilized for preparing the composite membranes of the invention may be made by a process which includes applying the following sequential steps to a porous membrane substrate cast from a polymer, selected from copolymers and homopolymers of ethylenically unsaturated nitriles, namely:

(a) crosslinking the porous membrane substrate;
(b) coating the product of step (a) with a thin layer of at least one polymer selected from polyphenylene oxide type polymers, provided that the thin layer includes at least one polymer derived from haloalkylated polyphenylene oxide type monomers; and
(c) crosslinking the coating applied in step (b) with at least one member selected from ammonia, aliphatic, cycloaliphatic, araliphatic and aromatic monoamines and polyamines. It is to be understood that "amines" in this context means compounds containing amine functions whether or not such functions are combined with other functions; thus, "amines" in the present specification and claims includes hydroxylamine, hydrazine and substituted (e.g. alkyl-substituted) hydroxylamines and hydrazines, in addition to those compounds conventionally considered as amines.. Moreover, "polyamines" in the present context is intended to mean such compounds containing more than one amine function in the molecule.

In another particular embodiment, there is provided in accordance with the present invention a composite membrane comprising a substrate made from polyacrylonitrile, which substrate has been subjected to a stepwise treatment sequence comprising the steps of:

(1) insolubilizing said polymer by crosslinking, comprising treatment with a base selected from organic and inorganic bases, the base-treated polyacrylonitrile substrate then being subjected to a heat-treatment sub-step, e.g. at a temperature within the range of about 110°-130° C.;

(2) coating the insolubilized with a layer including at least one polymer selected from polyphenylene oxide type polymers and polysulfone type polymers, as well as at least one polymer derived from haloalkylated polyphenylene oxide type monomers; and (3) crosslinking said layer by reaction with at least one member selected from the group consisting of ammonia; aliphatic, cycloaliphatic, araliphatic and aromatic amines monoamines and polyamines; hydroxylamine and substituted hydroxylamines; and hydrazine and substituted hydrazines.

It should be particularly noted that the substrate and the thin layer which includes at least one polymer derived from haloalkylated polyphenylene oxide type monomers, must both be crosslinked, in order to achieve a membrane which will be effective and stable in presence of organic solvents, especially those with strong solvating power; this is in contrast to known membranes involving applications to the separation of gases and organic vapors, where solvation effects are less pronounced.

Moreover, it has been found that performance of the membranes of the invention is very substantially affected by the type of crosslinker used. Thus, different crosslinkers can affect both flux and selectivity, in various solvent compositions. In particular, it has been found that in order to perform effective separations in certain solvents or solvent mixtures, certain crosslinkers are preferred over others.

Optimized performance (flux and rejection) can be achieved by adjusting the solubility parameter of the crosslinked membrane to the solubility parameter of the solvent being transported. This adaptation of the solubility parameter of the crosslinked membrane for optimized performance can be effected by choosing the crosslinker or alternatively (or additionally) by modifying the polyphenylene oxide type thin layer with additional pendent groups. Following this logic, it may be noted that membrane flux and selectivity can be substantially affected if the polymer backbone of the thin layer, which includes at least one polymer derived from haloalkylated polyphenylene oxide type monomers, is reacted before or after the coating step, in order to attach desired pendent groups. Thus, a limited proportion of haloalkyl substituents on the polyphenylene oxide polymer backbone may be reacted with secondary or tertiary amines not for crosslinking purposes, but for hydrophobic or hydrophilic modification of the membrane. Illustratively, there may be used for this purpose the secondary amines dimethylamine and diethylamine, and/or the tertiary amines trimethylamine, triethylamine, tributylamine and triethanolamine. The aromatic polymer backbone may also be modified by reacting, before or after casting, with e.g. chlorosulfonic acid (followed by hydrolysis) or nitric acid (followed by reduction and if desired derivatization of the thus-formed amine groups).

The initial porous membrane substrate, which is cross-linked in step (a), may be e.g. a reverse osmosis (RO), ultrafiltration (UF) or microfiltration (MF) membrane with an average pore size in the range of from 1 to 500 nm, preferably 1 to 100 nm, and most preferably 2 to 20 nm. In addition, a minimum porosity of about 10% is presently preferred, in order to achieve a sufficiently high flux.

The copolymers and homopolymers of ethylenically unsaturated nitriles referred to herein may be, for example, copolymers or homopolymers of acrylonitrile, ($C_{1-6}$-alkyl)acrylonitriles such as methacrylonitrile and hexylacrylonitrile, arylacrylonitriles such as (optionally substituted) phenylacrylonitrile, halo-substituted acrylonitriles such as fluoroacrylonitrile and chloroacrylonitrile and bromoacrylonitrile, as well as other substituted acrylonitriles such as thioloacrylonitrile. Homopolymers of acrylonitrile are presently preferred.

In the case of copolymers, suitable comonomers for copolymerization with the ethylenically unsaturated nitriles may contain, e.g., hydrophobic, hydrophilic, polar or ionic groups. Exemplary comonomers are vinyl esters of 2-18 carboxylic acids such as vinyl acetate; vinylpyridine; vinyl chloride; styrene; acrylic and methacrylic acids and their esters with e.g. $C_{1-4}$ alcohols; maleic anhydride; 2-aminoethyl methacrylate; allyl compounds such as allyl alcohol, allyl- and methallyl- sulfonic acids and their salts, e.g. the alkali metal salts, allyl and methallyl halides, allylamine and allyl p-toluenesulfonate. The term "copolymers" herein includes copolymerization products of ethylenically unsaturated nitriles with one or more comonomers; this term thus includes, by way of example acrylonitrile/styrene/butadiene (ABS), acrylonitrile/methyl methacrylate/vinyl acetate, and arylonitrile/methyl methacrylate/sodium allylsulfonate terpolymers, and quadripolymers. In the copolymers, the proportion of ethylenically unsaturated nitrile(s) by weight is preferably at least 20%, more preferably at least 50%, and most preferably at least 80% of the total monomers.

The initial porous membrane substrate may be cast by any of the methods known in the art, see e.g., U.S. Pat. Nos. 4,902,422, 4,029,582, GB 2,000,720A, U.S. Pat. Nos. 3,556,305, 3,615,024 and 3,567,810, the entire contents of all these disclosures being deemed to be incorporated herein by reference. Thus, for example, a suitable polymer may be dissolved in a solvent or solvent mixture (including, e.g., NMP, DMF, DMSO, DMAC, hexamethylphosphotriamide and/or dioxane), optionally containing one or more of the following additives, namely, co-solvents, non-solvents, salts, other electrolytes, surfactants, for altering or modifying the membrane morphology and its flux and rejection properties. A non-limiting list of such additives includes acetone, ethanol, methanol, formamide, water, methyl ethyl ketone, triethyl phosphate, sulfuric acid, hydrochloric acid, partial esters of fatty acids and sugar-derived alcohols as well as their ethylene oxide adducts, sodium dodecyl sulfate, sodium dodecyl sulfonate, NaOH, KCl, ZnCl$_2$, CaCl$_2$, LiNO$_3$, LiCl and Mg(ClO$_4$)$_2$.

It will be evident to persons skilled in the art that the membranes themselves may have any convenient configuration, such as flat sheets, tubes, tubelets, hollow fibers or they may be spiral-wound.

It will be appreciated that a particular advantage of the present invention is that, in order to avoid decomposing and deactivating heat-sensitive biologically active substances to which the invention may be applied, the purification and/concentration procedure may be conducted at ambient temperature.

When the composite membranes of the invention are used for the concentration of a biologically active substance, then the concentration in the initial admixture is increased by virtue of the fact that the utilized membrane rejects the substance in question and permits permeation of the solvent. The degree of achievable concentration may be up to the saturation point of the solute in the solvent, or even beyond this point. Persons skilled in the art will be aware that, notwithstanding that the objective of the described application of the composite membranes is an increase in the concentration of the biologically active substance, the initial admixture may nevertheless be diluted in order to give a higher initial flux or otherwise increase the rejection of the membrane for the desired solute. Moreover, the admixture at any time during the performance of the concentration procedure may be similarly diluted in order to give a higher initial flux or otherwise increase the rejection of the membrane for the desired solute, or even to increase the solubility of the solute (as its concentration increases) in the at least partially exchanged solvent. Addition of solvent during operation of the concentration procedure, which may be continuous or intermittent, may be optionally such as to maintain a constant volume of solvent as the concentration of the desired solute increases. After termination of the concentration procedure, the obtained solute/solvent admixture may of course be subjected to such known processes as chromatography, electrodialysis, crystallization, lyophilization, evaporation, precipitation, selective adsorption, and/or any other processes used in the art for retrieving and purifying materials.

It will further be appreciated by skilled persons that low molecular weight components (such as, for example, low molecular weight salts such as NaCl) which are present in the initial admixture may be simultaneously separated from the desired solute as the concentration of the latter increases, by permeation through the membrane.

In general terms, a membrane which has a cutoff at 1500 MW for a neutral molecule will reject substances of MW above about 1500 and allow the permeation of substances of MW below this figure. For charged molecules, however, the same membrane may effectively reject molecules of 300 MW. Similarly, a membrane which has a cutoff at 300 MW for neutral molecules will reject substances of MW above about 300 and allow the permeation of substances of MW below about 300, and a membrane which has a cutoff at 150 MW will reject substances of MW above about 150 and allow the permeation of substances of MW below about 150. In most cases, it is found that charged molecules are more effectively rejected and that the cutoff for charged molecules is different from that for neutral molecules, when using the same membrane. It will be evident from this discussion that a membrane can be selected with a particular cut off in order to retain particular substances and allow the permeation of others, which are present in the initial admixture.

The separation effect (rejection) of the membranes useful according to the present invention can be measured as follows. A circular membrane with a surface area of 13 cm.$^2$, resting on a sintered stainless steel disc, is used in a cylindrical cell made of stainless steel. 150 ml. of the solution (to be tested) which contains the substance to be tested in a concentration $C^1$ (g. substance/g. solution) are introduced onto the membrane in the steel cylinder and subjected to a pressure (N$_2$) of 14 bars. The solution is stirred magnetically. The liquid which collects on the outlet side of the membrane is examined to determine the concentration ($C^2$) therein of the substance to be tested, 3 samples of 5 ml. each being taken from the start of the experiment. In general, the amount which flows through the membrane and the composition of the 3 samples are constant. The rejection (R) can be calculated from the values obtained, using the equation:

$$R(\%) = (C^1 - C^2) \times 100/C^1.$$

The amount of material (F=flux) passing through the membrane per surface and time unit is determined from the equation:

$$F = V \times S^{-1} \times t^{-1}$$

where V=volume, S=membrane surface area and t=time. F may be expressed in terms of cubic meters of solution per square meter surface area of membrane per day, or in terms of liters of solution per square meter surface area of membrane per hour.

In addition to measurements on flat membranes, measurements on tubular membranes 60 cm. long and with an outer diameter of 1.4 cm. were also carried out. For this purpose the tubular membranes were placed in a perforated tube made of stainless steel. The whole (i.e. membrane with support) is then placed in another tube made of stainless steel. The outflow from the membrane is between this outer stainless steel tube and the perforated steel tube. The liquid is added as a stream of solution in turbulent or laminar flow under pressure. The flow rate is kept constant at 10-15 liters per minute. The rejection (R) and the flux (F) are calculated in the same way as for flat membranes.

The invention is illustrated by the following nonlimiting Preparation and Examples.

PREPARATION I

Polyacrylonitrile (98% homopolymer: DuPont A), MW (number average) 50,000, was dissolved in dimethylformamide (DMF), bob cast onto a tube of nonwoven polyester (1.27 cm. diameter) and gelled in ice-water. After washing with water for 12 hours, this substrate membrane has a 65% rejection to polyethylene glycol of 60K MW, and 5% rejection to sucrose. The polyacrylonitrile substrate was crosslinked by immersion for 15 minutes in 1% wt./vol. ethanolic sodium ethoxide, drained and then heated to 115° C. for 30 minutes. The original substrate was off-white or beige, but after this treatment, it was dark brown, and no longer soluble or swellable in DMF, NMP or DMSO. While the original membrane had less than 18% rejection to raffinose, the crosslinked membrane has a rejection of 45% to raffinose and a 94% rejection to dextran 70K.

EXAMPLE I

A mixture of 1% bromomethylated 2,6-dimethylphenylene oxide (MW 20,000, 3.2 meq./g. of active Br) and 0.2% m-phenylenediamine in toluene is used to coat a 20 microns thick microporous polypropylene (30% porosity) containing 0.45×0.045 micron rectangular pores, to form a 0.5 micron layer. This composite is then quaternized with trimethylamine. The resultant membrane had a 94% rejection to 500 ppm aspartame in 25:75 acetonitrile/water, with a flux of 400 l·/m²·d.

EXAMPLE II

The insolubilized support of Preparation I is coated with a toluene solution of 1% bromomethylated 2,6-dimethylphenylene oxide as in Example I (omitting the m-phenylenediamine), forming a 0.75 micron thick layer. After drying, the composite is immersed in a 10% aqueous ammonium hydroxide solution for 2 hours, and after removal is well rinsed with tap water. The PPO coating was thus crosslinked by the ammonia. The resultant membrane had a 99% rejection to 10% erythromycin in ethyl acetate, with a flux of 400 l·/m²·d at 40 bars.

EXAMPLE III

The insolubilized support of Preparation I is coated with a toluene solution of 10% bromomethylated 2,6-dimethylphenylene oxide as in Example II, forming a 0.2 micron thick, pinhole-free layer. After drying, the composite is immersed in a 10% solution of various reactants (see Table below) in tetrahydrofuran for 2 hours at room temperature, and after removal is well rinsed with tap water. The PPO coating was thus crosslinked by the respective reactants. The resultant membrane had the fluxes and rejections to a 0.1% solution in ethyl acetate of Sudan IV (an organic dye MW approx. 380, see The Merck Index, Tenth Edition, 1983, Monograph No. 8240) noted in the Table, which records also the fluxes for the pure solvents acetonitrile and ethyl acetate.

TABLE

Membrane performance as function of type of crosslinker

| Crosslinking reactant | Flux of pure solvents | | Sudan IV | |
|---|---|---|---|---|
| | $CH_3CN$ | AcOEt | Flux | % rejection |
| $NH_3$ | 400 | 480 | 400 | 90.2 |
| $NH_2NH_2$ | 565 | | 424 | 90.6 |
| $NH_2CH_2CH_2NH_2$ | 180 | 250 | 130 | 99.0 |
| $CH_3CH_2CH_2NH_2$ | 80 | 100 | 70 | 98.5 |
| $NH_2OH$ | 500 | 1200 | 700 | 91.2 |

EXAMPLE IV

Example III was repeated using various crosslinking reactants. Membrane flux was tested in different organic solvents and is shown in FIG. 1 (y-axis), relative to the flux measured in ethyl acetate. The x-axis plots the solubility parameter $\delta_t$ (also known as the Hildebrand solubility parameter) of the solvents tested, and represents the value of the cohesive energy density thereof (cohesive energy per unit volume); this is the internal molar energy of a material in a solid or liquid state (U) relative to the ideal vapor at the same temperature, and indicates the net attractive interactions in the material. $\delta_t = c^{0.5}$, where $c = -U/V$, and V is the volume. Two substances having similar $\delta_t$ values gain sufficient energy upon mixing and will be mutually soluble. The possibility of optimizing the performance of solvent stable polyphenylene oxide based membranes for various solvent streams and solutes by varying the nature of the crosslinking agents and/or pendent groups, is indicated by the data in FIG. 1.

The solvents ($\delta_t$ noted) shown in FIG. 1 are methyl isobutyl ketone (17.0), toluene (18.2), acetone (20.0), acetonitrile (24.4) and ethanol (26.5). The abbreviations in the Figure are: ON=overnight; RT=room temperature; 70°=70° C.; DAEt=1,2-diaminoethane; Quat=-following the crosslinking reaction, quaternization is effected using methyl iodide in ethanol.

While the present invention has been particularly described herein, persons skilled in the art will appreciate that many modifications and variations may be made in the practice of the invention. Accordingly, the invention is not to be construed as limited to the embodiments which have been particularly described, rather its concept, spirit and scope may be more readily understood from a consideration of the claims which follow.

We claim:

1. Composite solvent stable membranes which comprise a crosslinked layer of less than 5 microns in thickness supported on a solvent stable porous membrane substrate, which layer includes at least one polymer selected from polyphenylene oxide type polymers and polysulfone type polymers, provided that the crosslinked layer includes at least one polymer derived from haloalkylated polyphenylene oxide type monomers, and the crosslinking has been effected by reaction with at least one crosslinking reactant selected from the group consisting of ammonia; aliphatic, cycloaliphatic, araliphatic and aromatic amines monoamines and polyamines; hydroxylamine and substituted hydroxylamines; and hydrazine and substituted hydrazines.

2. Composite membranes according to claim 1, wherein said substrate is cast from a polymer, selected from copolymers and homopolymers of ethylenically unsaturated nitriles.

3. A composite membrane according to claim 2, wherein said ethylenically unsaturated nitriles are selected from the group consisting of acrylonitrile and substituted acrylonitriles.

4. Composite membranes according to claim 1, which has been modified subsequent to crosslinking by attachment of pendent groups effective to modify the characteristics of the membrane selected from its hydrophilic and hydrophobic characteristics.

5. Composite membranes according to claim 1, wherein said crosslinked layer is ionically charged.

6. A composite membrane according to claim 1, wherein said substrate is self-supporting.

7. A composite membrane according to claim 1, wherein said substrate is supported on another porous material.

8. A composite membrane according to claim 1, which is substantially insoluble in the following solvents, namely, acetonitrile, ethanol, hexane, toluene, N-methylpyrrolidone, dimethylsulfoxide, dimethylformamide, dimethylacetamide, mixtures thereof with each other, and mixtures of any of the foregoing with water.

9. A composite membrane according to claim 8, which swells to an extent of no more than about 10% when immersed in said solvent.

10. A composite membrane comprising a substrate made from a polymer selected from copolymers and homopolymers of ethylenically unsaturated nitriles, which substrate has been subjected to a stepwise treatment sequence comprising the steps of:
(1) insolubilizing said polymer by crosslinking;
(2) coating the insolubilized with a layer including at least one polymer selected from polyphenylene oxide type polymers and polysulfone type polymers, as well as at least one polymer derived from haloalkylated polyphenylene oxide type monomers; and
(3) crosslinking said layer by reaction with at least one member selected from the group consisting of ammonia; aliphatic, cycloaliphatic, araliphatic and aromatic amines monoamines and polyamines; hydroxylamine and substituted hydroxylamines; and hydrazine and substituted hydrazines.

11. A composite membrane according to claim 10, wherein said substrate is self-supporting.

12. A composite membrane according to claim 10, wherein said substrate is supported on another porous material.

13. A composite membrane according to claim 10, which is substantially insoluble in the following solvents, namely, acetonitrile, ethanol, hexane, toluene, N-methylpyrrolidone, dimethylsulfoxide, dimethylformamide, dimethylacetamide, mixtures thereof with each other, and mixtures of any of the foregoing with water.

14. A composite membrane according to claim 13, which swells to an extent of no more than about 10% when immersed in said solvent.

15. A composite membrane according to claim 10, wherein said ethylenically unsaturated nitriles are selected from the group consisting of acrylonitrile and substituted acrylonitriles.

16. A composite membrane according to claim 10, wherein said insolubilizing step comprises treatment with at least one base selected from organic and inorganic bases.

17. A composite membrane according to claim 16, wherein subsequent to said treatment with at least one base, said substrate is subjected to a heat-treatment sub-step at elevated temperature.

18. A composite membrane according to claim 10, which has been modified subsequent to crosslinking by attachment of pendent groups effective to modify the characteristics of the membrane selected from its hydrophilic and hydrophobic characteristics.

19. A composite membrane according to claim 10, wherein said crosslinked layer is ionically charged.

20. A composite membrane comprising a substrate made from polyacrylonitrile, which substrate has been subjected to a stepwise treatment sequence comprising the steps of:
(1) insolubilizing said polymer by crosslinking, comprising treatment with a base selected from organic and inorganic bases, the base-treated polyacrylonitrile substrate then being subjected to a heat-treatment sub-step at the temperature within the range of about 110°–130° C.;
(2) coating the insolubilized with a layer including at least one polymer selected from polyphenylene oxide type polymers and polysulfone type polymers, as well as at least one polymer derived from haloalkylated polyphenylene oxide type monomers; and
(3) crosslinking said layer by reaction with at least one member selected from the group consisting of ammonia; aliphatic, cycloaliphatic, araliphatic and aromatic amines monoamines and polyamines; hydroxylamine and substituted hydroxylamines; and hydrazine and substituted hydrazines.

21. A composite membrane according to claim 20, which has been modified subsequent to crosslinking by attachment of pendent groups effective to modify the characteristics of the membrane selected from its hydrophilic and hydrophobic characteristics.

22. A composite membrane according to claim 20, wherein said crosslinked layer is ionically charged.

* * * * *